2,701,806

3-KETO-BISNOR-CHOLAN-22-ALS

Robert A. Donia, Kalamazoo Township, Kalamazoo County, Mich., assignor to The Upjohn Company, Kalamazoo, Mich., a corporation of Michigan No Drawing. Application June 21, 1952,
Serial No. 294,920

3 Claims. (Cl. 260—397.3)

The present invention relates to the novel steroid compounds 3-keto-bisnor-cholan-22-al and 3-keto-allobisnor-cholan-22-al and their methyl-hemiacetals.

An object of this invention is to provide the novel, useful, and industrially important 3-keto-bisnor-cholan-22-al and 3-keto-allobisnor-cholan-22-al. Illustrative of the uses of these aldehydes is the conversion of each to the physiologically active steroid hormone, progesterone, by heating with piperidine and removing the water formed to obtain 22-(N-piperidyl)-20(22)-bisnor-cholen-3-one or the corresponding allo compound, ozonizing the amino-ethylene compound and subsequently decomposing the ozonide to obtain the known 3,20-pregnanedione or 3,20-allopregnanedione. 3,20-pregnanedione is brominated with bromine in acetic acid to obtain the four-bromo derivative which is dehydrohalogenated with pyridine to obtain the important steroid hormone progesterone. 3,20-allopregnanedione is converted to progesterone by known procedure for converting three-ketoallosteroids to $\Delta^4$-3-ketosteroids [Rosenkranz, Mancera, Gatica, and Djerassi, J. Am. Chem. Soc., 72, 4077 (1950)]. A further object of this invention is to provide the methyl-hemiacetals of 3-keto-bisnor-cholan-22-al and 3-keto-allobisnor-cholan-22-al, which, as is unexpected from the hemiacetal prior art, are stable, readily isolated, and easily purified compounds, and from which, as is well-known in the art, the free aldehydes may be regenerated in high yield. Other objects and uses will be apparent to those skilled in the art to which this invention pertains.

The following examples are illustrative of the products and processes of the present invention, but are not to be construed as limiting.

PREPARATION 1.—22-COPROERGOSTEN-3-ONE

Two grams of five per cent palladium-charcoal catalyst is added at room temperature to a solution of 1.4 grams of potassium hydroxide (reagent grade, 85 per cent) in three liters of methanol contained in a five-gallon cylindrical bottle. The air in the bottle is displaced with hydrogen, and then, with vigorous mechanical stirring, hydrogen is introduced at about one to two atmospheres absolute pressure to prereduce the catalyst. Then 12.5 grams of 4,6,22-ergostatrien-3-one [Wetter and Dimroth, Ber., 70, 1665 (1937)], melting point 107–109 degrees centigrade, dissolved in 750 milliliters of methanol is added. To the resulting admixture 2.0 to 2.1 mole equivalents of hydrogen is introduced at about one to two atmospheres absolute pressure using vigorous mechanical stirring, the reaction being very rapid. When the selective hydrogenation reaction is complete, the mixture is acidified with acetic acid, filtered, and the solvent distilled from the resulting filtrate. The residual solid is triturated with water, filtered, and dried. The resulting white crystalline solid, approximately the theoretical amount, shows no absorption in the ultraviolet range of the light spectrum indicating complete hydrogenation of the four and six-double bonds. Infrared light absorption analysis shows that the three-keto group and the 22-double bond are unaffected. Chromatographic adsorption of the above product, using Florisil magnesium silicate as the adsorbent and one per cent acetone in Skelly Solve B for elution, gives pure 22-coproergosten-3-one; yield 79 per cent of the theoretical amount; melting point 109–113 degrees centigrade; $[\alpha]_D^{24}$ minus five degrees in chloroform.

Analysis:
Calculated for $C_{28}H_{46}O$: C, 84.35; H, 11.63
Found:  C, 84.37; H, 11.79

22-alloergosten-3-one also is isolated, the yield being about ten per cent of the theoretical amount.

PREPARATION 2.—22-ALLOERGOSTEN-3-ONE

Following the procedure of Preparation 1, but omitting the potassium hydroxide, 4,6,22-ergostatrien-3-one is converted to the theoretical weight of product containing about equal amounts of 22-alloergosten-3-one and 22-coproergosten-3-one, a high percentage of each being isolated.

Example 1.—3-keto-bisnor-cholan-22-al

Five grams (0.0125 mole) of 22-coproergosten-3-one (Preparation 1) is dissolved in 225 milliliters of methylene dichloride containing two milliliters of pyridine. The resulting solution is cooled in a Dry-Ice-acetone bath to about minus seventy degrees centigrade and is stirred mechanically while a stream of an ozone-oxygen mixture is bubbled through the solution. The amount of ozone introduced is about 1.3 moles per mole of steroid. After ozonization is complete the resulting solution is treated with thirty milliliters of glacial acetic acid followed by ten grams of zinc and then stirred for one hour, the temperature being allowed to rise to about zero degrees centigrade during this period. The mixture is then filtered to remove the zinc, and the filtrate is washed with ice water, cold dilute sodium bicarbonate solution, and again with ice water. The methylene dichloride solution, after drying over anhydrous sodium sulfate, is concentrated under reduced pressure to a volume of about twenty milliliters. Forty milliliters of isopropanol is then added and the solution further concentrated until crystals begin to form. After refrigeration at zero degrees centigrade overnight, 2.60 grams of 3-keto-bisnor-cholan-22-al is obtained. Further concentration of the mother liquor gives an additional 0.93 gram of aldehyde. The structure was confirmed by infrared light absorption analysis; total yield 85.2 per cent of the theoretical amount; $[\alpha]_D^{24}$ plus nineteen degrees in chloroform; melting point 140 to 142 degrees centigrade.

Analysis:
Calculated for $C_{22}H_{34}O_2$: C, 79.95; H, 10.37
Found:  C, 79.73; H, 10.28
  C, 79.82; H, 10.45

Example 2.—3-keto-allobisnor-cholan-22-al 22-alloergosten-3-one (Preparation 2) is converted to 3-keto-allobisnor-cholan-22-al using the same procedure as in Example 1 for the formation of the ozonide, decomposition of the ozonide, and isolation of the desired 3-keto-allobisnor-cholan-22-al.

Example 3.—3-keto-bisnor-cholan-22-al methyl-hemiacetal

Using the exact procedure of Example 1, but substituting methanol for the isopropanol, the methyl-hemiacetal of 3-keto-bisnor-cholan-22-al is produced instead of the free aldehyde; melting point 136–138 degrees centigrade; yield 86.3 per cent of the theoretical amount. The product is identical with the 3-keto-bisnor-cholan-22-al methyl-hemiacetal prepared by dissolving one gram of 3-keto-bisnor-cholan-22-al in ten milliliters of methanol, adding two milliliters of water and one drop of acetic acid, warming the resulting solution on a steam bath for thirty minutes, and then cooling the solution at zero degrees centigrade to precipitate the 3-keto-bisnor-cholan-22-al methyl-hemiacetal obtained. Infrared light absorption analysis indicates the presence of hydroxyl and ketone groupings and the absence of an aldehyde group. The presence of a methoxyl group is indicated by the Zeisel method of determining methoxyl groups; $[\alpha]_D^{23}$ plus nineteen degrees in chloroform.

Analysis:
Calculated for $C_{23}H_{38}O_3$: C, 76.20; H, 10.56
Found:  C, 76.41; H, 10.79
  C, 76.62; H, 10.39

The methyl-hemiacetal is much easier to isolate and purify than the free aldehyde, since the methyl-hemiacetal is less soluble in organic solvents than the free aldehyde, and the methyl-hemiacetal is therefore additionally useful in obtaining the pure free aldehyde.

*Example 4.—3-keto-allobisnor-cholan-22-al methyl-hemiacetal*

Following the procedure of Example 3, 22-alloergosten-3-one is converted to 3-keto-allobisnor-cholan-22-al methyl-hemiacetal.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:
1. A compound selected from 3-keto-bisnor-cholan-22-als of the formula

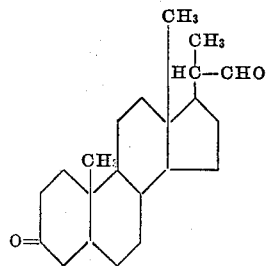

and the methyl-hemiacetals thereof.
2. 3-keto-bisnor-cholan-22-al.
3. 3-keto-bisnor-cholan-22-al methyl-hemiacetal.

References Cited in the file of this patent

Heyl et al.: Jour. Am. Chem. Soc. 72, 2617–19 (1950).